March 2, 1971 J. V. GRABER ET AL Re. 27,086

SUPPORT FOR DRAPERIES AND THE LIKE

Original Filed July 23, 1965 3 Sheets-Sheet 1

Inventors
Josef L. V. Graber
Ferdinand J. Salzmann
By
McCanna, Morsbach + Pillote
Attorneys SUPPORT FOR DRAPERIES AND THE LIKE
Original Filed July 23, 1965 3 Sheets-Sheet 2
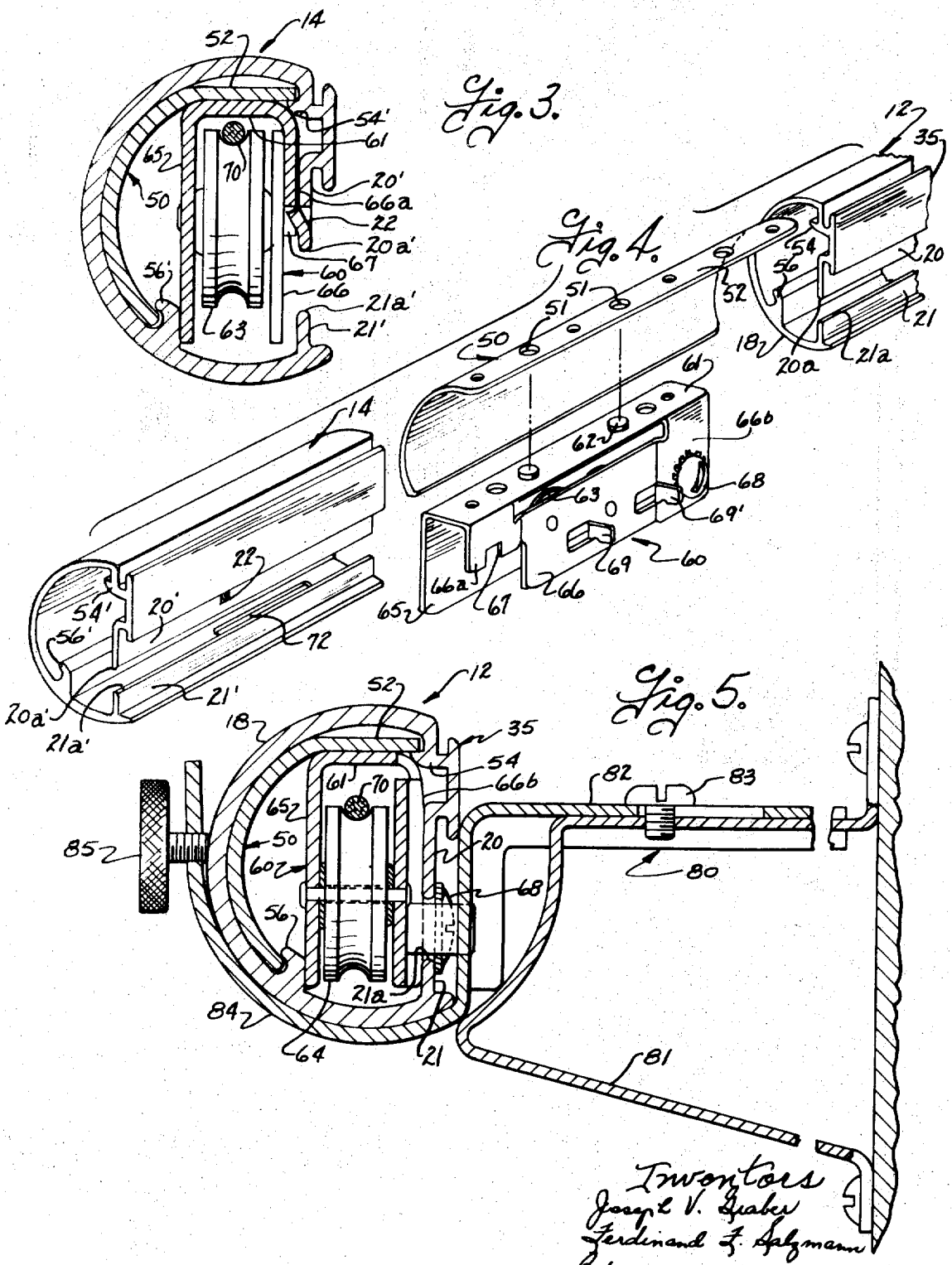
Inventors
Joseph V. Graber
Ferdinand F. Salzmann
By
McCanna, Morsbach & Pillote
Attorneys

SUPPORT FOR DRAPERIES AND THE LIKE

Original Filed July 23, 1965 3 Sheets-Sheet 3

Inventors
Joseph V. Graber
Ferdinand J. Salzmann
By
McCanna, Morsbach & Pirsch
Attorneys United States Patent Office Re. 27,086
Reissued Mar. 2, 1971

27,086

SUPPORT FOR DRAPERIES AND THE LIKE

Joseph V. Graber, Waunakee, and Ferdinand F. Salzmann, Madison, Wis., assignors to Consolidated Foods Corporation, Chicago, Ill.

Original No. 3,342,247, dated Sept. 19, 1967, Ser. No. 474,397, July 23, 1965. Application for reissue Sept. 16, 1968, Ser. No. 777,926
Int. Cl. A47h *5/00*
U.S. Cl. 160—345 7 Claims

Matter enclosed in heavy brackets [ ] appears in the original patent but forms no part of this reissue specification; matter printed in italics indicates the additions made by reissue.

ABSTRACT OF THE DISCLOSURE

A hollow drapery rod having a slot for drapery carriers is formed in separate rod sections abutted end-to-end and an internal splice extends into the hollow rod sections to join the same. Splice locating means are provided on the inside of the rod sections at the longitudinal edges of the splice to retain the splice spaced from the slot and hold the rod sections aligned. Traverse cord guide means for guiding the traverse cord are connected to the splice.

This invention relates to improvements in supports for draperies, curtains, and the like.

An object of this invention is to provide a new and useful drapery support including a rod having a separate end member with a pulley housing disposed therein and an opening in the end member adjacent the pulleys to provide an opening for the pull cords.

Another object of this invention is to provide a drapery support including a rod having at least two matching members abutted end to end and spliced together, a mounting bracket having a generally U-shaped portion for cradling the rod and supporting the same, and a means on the rod for locating the bracket to cover the lower portion of the abutted ends and thereby give an appearance of a continuous rod.

Still another object of this invention is to provide a drapery support including a rod having at least two matching portions abutted together end to end, said portions having a pair of projections on the inner side thereof, and a splice member shaped for engaging a portion of the inner face of said members and held in position by said projections.

Yet another object is to provide a drapery support in accordance with the foregoing object and including a pulley housing engageable with the splice member.

A further object is to provide a drapery support in accordance with the foregoing object in which the rod has an elongated slot therein to receive a plurality of drapery holders slidably mounted therein and in which the pulley housing has fastening means engageable with the rod for holding the adjacent portions in said abutted relationship.

A still further object of the invention is to provide a drapery support in accordance with the foregoing object and including a pair of fingers on the pulley housing extending through the slot, one of said fingers on either side of the abutted ends of the rod portions, and a mounting bracket disposed between the fingers and having a generally U-shaped portion for cradling the rod and supporting the same and whereby the bracket covers a lower portion of the abutted ends to give an appearance of a continuous rod.

A yet further object of this invention is to provide a drapery support including a rod having a rail adjacent the back side thereof and a mounting bracket for engaging the rail, said bracket being substantially hidden by the rod by reason of its location.

It is another object of this invention to provide a drapery support in accordance with the above objects in which the various parts of the rod portion have an identical cross-section and thus may be fabricated from the same extrusion of material, and in which an end portion of the rod is fabricated with a slot for the pull cords and with the pulley housing and splice member secured thereto; whereby a rod of preselected length may be formed by cutting an elongate portion of the rod to the required dimension and abutting the elongate portion of the rod to the required dimension and abutting the elongate portion to the end portion having the splice means attached thereto.

Further objects of this invention are to provide a drapery support which is attractive, versatile, and easily assembled.

These, together with other objects and advantages of this invention will be more readily appreciated as the invention becomes better understood by reference to the following detailed description when taken in accordance with the accompanying drawings wherein:

FIG. 3 is a sectional view taken generally along line 3—3 of FIG. 2;

FIG. 4 is an exploded perspective view showing two portions of the rod, the splice member, and pulley housing;

FIG. 5 is a sectional view taken generally along line 5—5 of FIG. 2;

Figure 1:
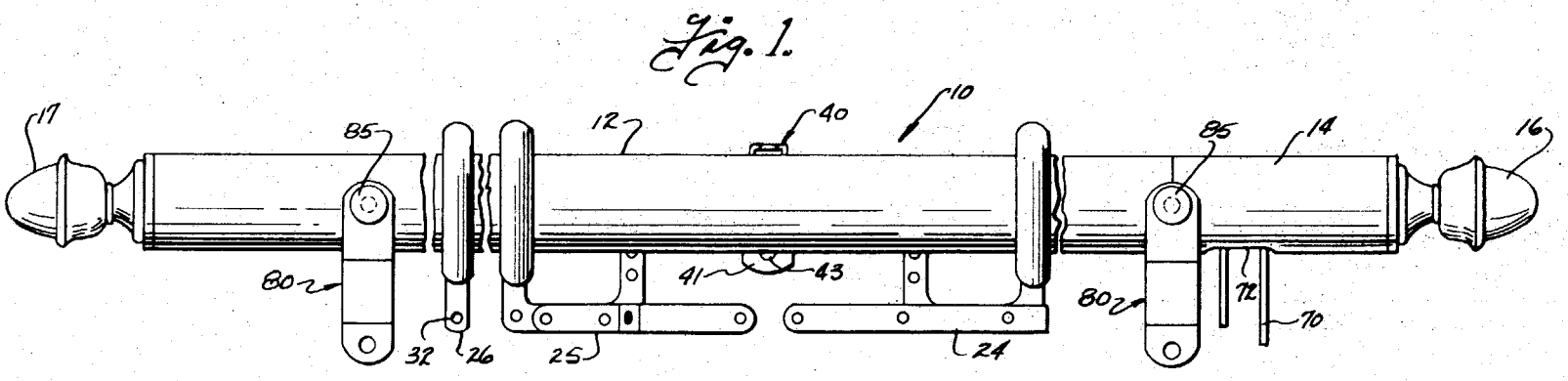
FIGURE 1 is a front elevational view of an embodiment of this invention.
Figure 2:
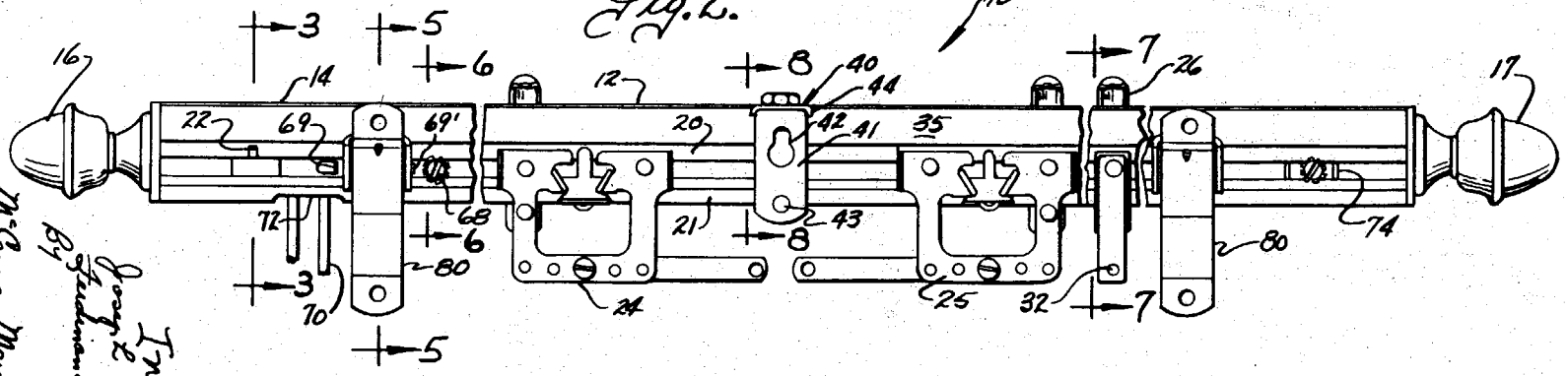
FIG. 2 is a rear elevational view of the embodiment illustrated in FIG. 1.
Figure 6:
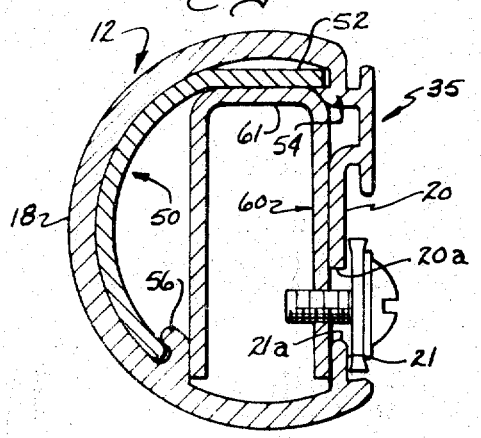
FIG. 6 is a sectional view taken generally along line 6—6 of FIG. 2.

Reference is now made more particularly to the drawings, wherein similar reference characters designate corresponding parts throughout the several views. For convenience, the embodiment of the invention best illustrated in FIGS. 1 and 2, is herein sometimes referred to as a drapery support; however, this is done by way of illustration and it should be understood that the support may be used with any type of drapery, curtain, tapestry, or other similar hanging. The drapery support, generally designated by the numeral 10, includes an elongate tubular member 12, and a relatively short end member 14. Decorative plugs 16 and 17 may be fitted into the ends of members 14 and 12, respectively. Elongate tubular member 12 is conveniently formed by extrusion and, in the preferred embodiment, has a generally D-shaped cross-section including an arcuate front wall 18 and a generally upright rear wall including upper and lower rear wall portions 20 and 21, as best shown in FIGS. 4–8. Said rear wall portions have their respective edges 20a and 21a spaced apart to define a longitudinal slot extending substantially the full length of the elongate member 12.

End member 14, in the preferred embodiment, is formed from the same extrusion as elongate member 12. Similar parts are, therefore, designated by the same number followed by the postscript prime (′).

Figure 7:
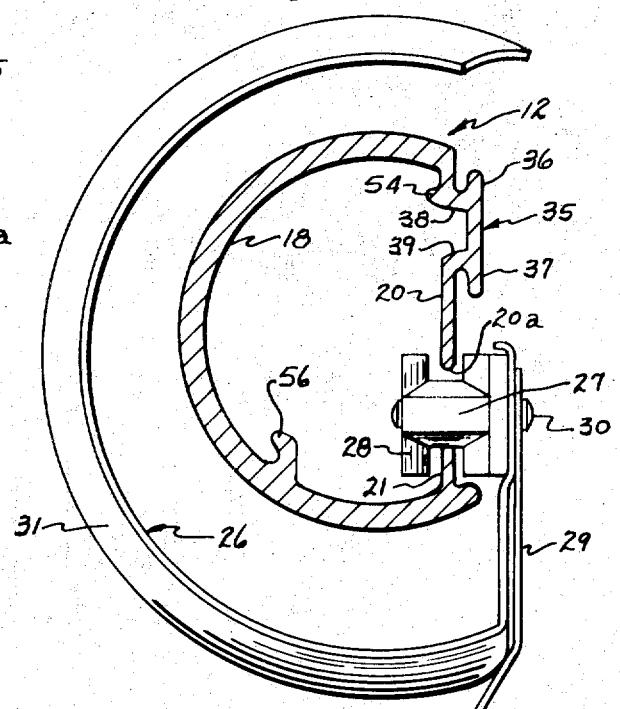
FIG. 7 is a sectional view taken generally along line 7—7 of FIG. 2.

Master slides 24 and 25 and a plurality of auxiliary slides or holders 26 are mounted in the aforedescribed slot, as best shown in FIG. 2. As shown, the master slides are provided and connected to traverse cords 70 for movement in relatively opposite directions toward and away from the center of the rod in a manner well known in the art. It should be understood that in various uses, only one master slide may be provided for one-way traverse operation, or that they may be eliminated altogether as best shown in FIG. 7, the holder 26 may be of any conventional construction and in general includes a body 27 slidably received in the slot. As is conventional, the slide body 27 has a head portion 28 at the inside of the rod, which head portion is larger than the width of the slot so as to normally retain the slide bodies in the rod. Pendants 29 are attached to the holders and are preferably supported for swinging movement by a fastener 30. Decorative slide rings 31 may be mounted on the holder 26, if desired, to simulate the conventional rings of a ring pole rod. It is contemplated that, in some uses the conventional rings (not shown) may be utilized with the present invention. The pendant 29 has a means for supporting a drapery such as an opening 32 (FIGS. 1 and 2) for receiving the drapery hook.

Figure 8:
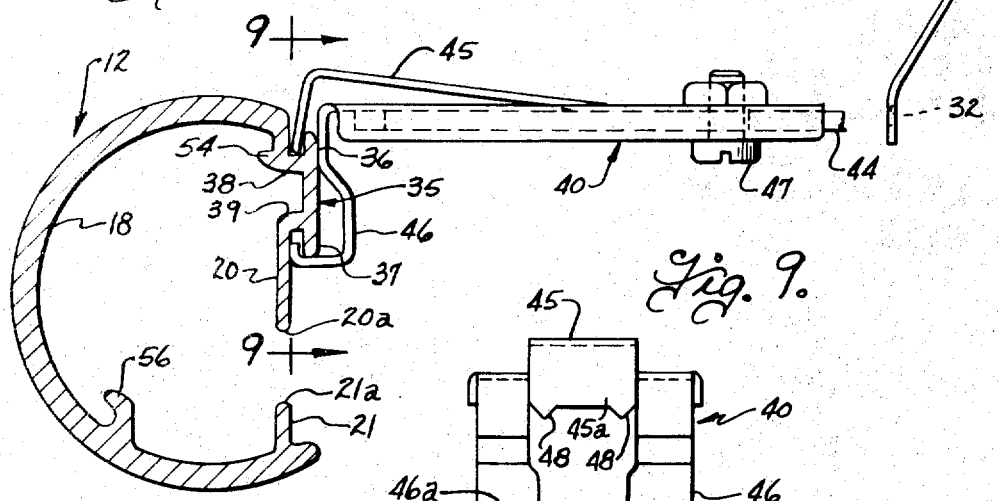
FIG. 8 is a sectional view taken generally along line 8—8 of FIG. 2.
Figure 9:
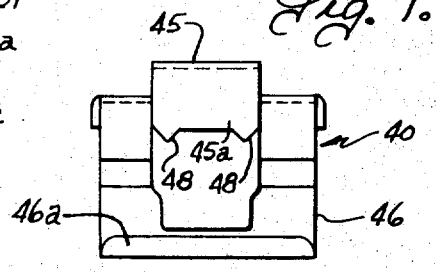
FIG. 9 is a front view of the rail engaging bracket taken generally along line 9—9 of FIG. 8.

A salient feature of the invention is the provision of a rail and a bracket for engaging the rail in such a manner that the bracket is subsantially hidden by the rod or tubular member. This is particularly advantageous for intermediate supports on a drapery rod, but it is contemplated that such a rail and bracket arrangement may be utilized anywhere on the rod. In the embodiment illustrated, a rail, generally designated by the numeral 35, is mounted on the upper rear wall 20 adjacent the upper end thereof. In its preferred form, the rail includes two opposite facing, generally upright flanges 36 and 37 attached to the rear wall by two spaced web members 38 and 39, as shown in FIGS. 7 and 8. The rail is engaged by a bracket generally designated by the numeral 40, shown in FIGS. 8 and 9, and which will hereafter be more fully described. The rail is preferably spaced above the slot a distance sufficient to allow a master slide or a body 27 of holder 26 to easily move past the bracket 40 when it is engaged with the rail. In the embodiment illustrated, bracket 40 conveniently includes a generally upright portion 41 for lying contiguous to a mounting surface and having a plurality of openings 42 and 43 therein for the entrance of fastener to be engaged with the mounting surface, as illustrated in FIG. 2. A horizontally disposed arm 44 extends outwardly from the upright portion 41 and has fingers 45 and 46 connected thereto as by fastener 47. The fingers 45 and 46 are preferably constructed of spring steel and formed from one piece by stamping. As best shown in FIGS. 8 and 9, the fingers 45 and 46 are arranged so that their outer portions 45a and 46a, respectively, face in generally opposite directions and are springily interconnected for compressibly engaging the rail. Because of the springable arrangements of the fingers, the bracket not only securely engages the rail, but is also easily connected and disconnected. A plurality of teeth 48 are conveniently arranged on the outer end 45a for engaging web 38 of rail 35 and thereby securely holding the rod from longitudinal movement. It is contemplated that similar teeth may be arranged on outer portion 46a or that they may be eliminated altogether. It should be noted that the rail 35 is mounted adjacent the top of tubular member 12, in its preferred form, but that the upwardly extending flange 36 does not rise above the top of the member. In this manner, when the bracket 40 is engaged to the rail, a majority of the bracket is disposed behind the rod and is substantially hidden thereby (FIG. 1). Also, not only will body 27 of the holder 26 pass by the bracket, but the upper end of the decorative ring 31 will easily pass over the bracket 40 as can be seen by comparing FIGS. 7 and 8. Thus, the bracket 40 and rail 35 provide a unique arrangement for supporting the tubular member 12 in a fashion whereby the bracket is substantially hidden from view.

Another feature of this invention is the internal splice arrangement illustrated in FIGS. 3 through 6. The splice member, generally designated by the numeral 50 includes a generally arcuate cross-section for lying contiguous to the inside of the front wall of the two members that are being spliced together, for example, members 12 and 14. Elongate member 12 has first and second projections 54 and 56 for engaging the longitudinal edges of the splice member to hold the same contiguous to its inside front wall. For this purpose, first projection 54 extends from rear wall 20 and second projection 56 extends from front wall 18. The member to be spliced thereto, for example, end member 14, preferably has similar first and second projections, 54' and 56', as illustrated in FIGS. 3 and 4. In this manner, the members being spliced together are axially aligned by the splice member 50 and the splice member is conveniently contiguous to the front wall so as to be spaced away from the slot to provide for freedom of movement of holders 26 and master slides 24 and 25 along the slot.

The above described internal splice arrangement provides room for a pulley housing to be disposed inside the tubular members. The pulley housing, generally designated by the numeral 60, is conveniently an inverted U-shape having a generally flat upper end 61 with a plurality of upstanding bosses 62 thereon, as best shown in FIG. 4. Splice member 50 conveniently has a plurality of openings 51 for receiving the upstanding bosses 62 and has a portion 52 adjacent its upper end which is generally flat for lying contiguous to the flat end 61 of the pulley housing. The pulley housing 60 has a pair of pulleys 63 and 64 mounted on side walls 65 and 66 of the housing. Side wall 66 has flared portions 66a and 66b adjacent either end for lying contiguous to the respective tubular member in which the housing is disposed, as members 14 and 12 respectively, as best shown in FIGS. 3 and 5. Flared portion 66a has a notch 67 therein into which an indentation 22 in upper rear wall 20' of end member 14 may be inserted (FIG. 3) as a fastening means for holding the pulley housing and splice member in position. It is contemplated that the end member, splice member, and pulley housing may be preassembled and secured in position by the indentation 22 which is formed at that time. Flared portion 66b is provided with a fastener in the form of a screw 68 (see FIGS. 2 and 4) for passing through the slot and for clasping the upper and lower rear wall portions 20 and 21 of tubular member 12 and thereby operating as a fastening means to hold the tubular member 12 in position with respect to the housing 60, splice member 50, and end member 14. It is contemplated that other types of fastening means may be utilized; however, the described arrangement is both economical and convenient. When the proper length of the tubular member 12 has been selected, the splice member and pulley housing need only be inserted into the end of said member and the screw 68 tightened to provide a continuous rod assembly. It should be obvious that the pulley housing is advantageous only when used with the traverse rod and, in such circumstance, a pull cord 70 will be utilized. A downwardly facing slot 72 is conveniently provided in end member 14 to provide an exit for the pull cord. When two master slides are utilized, as shown, the cord means 70 passes over one pulley 63, is attached to one master slide 25, and then passes around end pulley 74 secured in the slot of the elongate member 12 (FIG. 2). The cord 70 is then attached to the other master slide 24 and passes over the other pulley 64 and both ends exit through slot 72. While the illustrated arrangement has the end member 14 adjacent the right end of the rod, as viewed from the front (FIG. 1), it should be understood that a left hand end member could be utilized, or that two end members may be used, if convenient.

Pulley housing 60 has a pair of fingers 69 and 69' on wall 66. These fingers preferably extend through the slots defined by the upper and lower rear wall portions of the respective members and are disposed one on either side of the abutted ends for engaging a bracket 80 and positioning the same. As best seen in FIG. 1, the bracket is thereby positioned in such a manner that the lower portion of the abutted ends are covered and thereby gives an appearance of a continuous rod as normally viewed from below. It is contemplated that other types of position means may be utilized and that the upper portion of the abutted ends may also be covered. The bracket 80 conveniently includes a body 81 for engaging a mounting surface and an outer member for cradling the rod or members. The outer member is conveniently in the form of a horizontally disposed portion 82 attached to the body by a fastener 83 and a generally U-shaped portion 84 for receiving and cradling the rod. The U-shaped portion is preferably configurated to closely receive the rod and, in the embodiment illustrated includes a generally upright rear portion and, a generally arcuate forward portion. An attractive fastener 85, in the form of a rosette, is attached adjacent the outer end of the U-shaped portion 84 for engaging the member or rod and holding it in position, as best shown in FIG. 5. As discussed above, the bracket 80 covers the lower portion of the abutted ends to give the appearance of a continuous rod. Additionally, the bracket is positioned by fingers 69 and 69' in an area closely adjacent the exit of the cord means 70 which pass over the pulleys 63 and 64 and then through slot 72. When the operator pulls on the cords 70, the greatest amount of force is applied at the pulleys 63 and 64 and since the bracket 80 is closely adjacent thereto, it provides support in such a manner that the force on the cord means is not multiplied by any significant moment arm. In this manner, the splice is more effective since the force is not transmitted along the rod for any great distance.

While we have thus described a preferred embodiment of our invention, this has been done by way of illustration and not limitation [and we do not wish to be limited except as required by the appended claims].

We claim:

[1. A support for draperies and the like comprising a rod including first and second tubular members having matching exterior faces and abutted end to end, each said tubular member having a longitudinal slot therein, said longitudinal slots arranged in substantial alignment to provide a continuous slot extending generally the full length of the rod, a plurality of holders slidably mounted on the rod and each having a portion projecting through said slot, an elongate splice member shaped for engaging a portion of the inner wall of each tubular member in an area adjacent said abutted ends, and at least one longitudinal projection on each tubular member for engaging the splice member and holding the same in a position spaced from said longitudinal slots to allow free movement of said holders past at least a portion of said splice.]

[2. A supoprt for draperies and the like comprising a rod including first and second tubular members having identical cross-sections and abutted end to end, a longitudinal slot in each tubular member and adjacent the back side thereof, said longitudinal slots arranged in substantial alignment to provide a continuous slot extending generally the full length of the rod, a plurality of holders slidably mounted on the rod and each having a portion projecting through said slot, an elongate splice member shaped for engaging a portion of the inner wall of each tubular member in an area adjacent the abutted ends, first and second projections on the inside of each tubular member for engaging opposite side edges of said splice member and holding the same in a position spaced from the longitudinal slots to allow free movement of said holders past at least a portion of said splice.]

[3. A support for draperies and the like comprising a rod including first and second tubular members abutted end to end, said members each having generally identical D-shaped cross-sections including an arcuate front wall and a substantially upright back wall, said rod having a longitudinal slot in said back wall extending substantially the full length of the rod, a plurality of holders slidably mounted on the rod and each having a portion projecting through said slot, an elongate splice member having an arcuate cross-section for lying contiguous to the inside of said front wall of each tubular member in an area adjacent the abutted ends to provide a splice thereof, first and second projections extending substantially the full length of the inside of said rod for engaging the longitudinal edges of the splice member to hold the same contiguous to the tubular members and to axially align said tubular members, at least one of said projections attached to the front wall at the point spaced from the back wall a distance sufficient to allow free movement of the holders.]

[4. A supoprt for draperies and the like comprising a rod including first and second tubular members abutted end to end, said members each having identical D-shaped cross-sections including an arcuate front wall and a substantially upright back wall, said rod having a longitudinal slot in the lower portion of said back wall extending substantially the full length of the rod, a plurality of holders each including a body slidably received on said slot and a head portion inside the rod and larger than the slot to retain the body on the slot, an elongate splice member having an arcuate cross-section and contiguous to the inside of the front wall of each tubular member in an area adjacent the abutted ends to provide a splice therefor, first and second projections extending substantially the full length of the inside of said rod for engaging the longitudinal edges of the splice member to hold the same contiguous to the front wall and to axially align said tubular members, said first projection attached to the back wall adjacent the upper end thereof, said second projection attached to the lower portion of the front wall and spaced from the back wall a distance at least equal to the thickness of said head to allow free movement of the holders in the slot, and means holding the members from longitudinal movement relative to each other thereby retaining the tubular members in said abutted relationship.]

5. A support for draperies and the like comprising a first elongate tubular member having a longitudinal slot in the rear side thereof, an end member abutted to the end of said first member, said members having matching faces adjacent said abutted ends, splice means inside said members for axially aligning the same, a pulley housing disposed between said splice means and said members, means on said pulley housing for engaging said splice means, and fastening means on the pulley housing connected to said members for holding the members in said abutted relationship.

6. A support for draperies and the like comprising a first elongate tubular member, a relatively short end member abutted to the end of said first member, said members each having identical D-shaped cross-sections including an arcuate front wall and a generally upright rear wall, the rear wall of each member having a longitudinal slot therein extending substantially the full length of the member, an elongate splice member having an arcuate cross-section and contiguous to the inside of the front wall of each tubular member in an area adjacent the abutted ends to provide a splice therefor, first and second longitudinal projections extending generally the full length of said members for engaging the splice member to hold the same contiguous to the front wall, said first projection attached to the back wall adjacent the upper end thereof, said second projection attached to the lower portion of the front wall and spaced from said back wall, a pulley housing disposed inside said members between the back wall thereof and said second projections, said pulley housing having means for engaging the upper portion of the splice member and fastening means engaged to each member to hold the same in abutted relationship, a plurality of pulleys attached to said housing, a master slide slidably mounted on the slot of said first member, a plurality of holders slidably mounted on the slot between said master slide and the pulley housing, and cord means extending from said pulleys and attached to the master slide for remotely moving the same, said end member having a downwardly facing opening therein adjacent said pulleys for extension of the cord means outside the end members.

7. A support for draperies and the like comprising a rod including first and second tubular members having identical cross sections and abutted end-to-end, said tubular member each having wall means defining continuous front, top, and bottom walls and a generally upright rear wall, said rear wall having upper and lower portions spaced apart to define a longitudinal slot extending generally the full length of the rod, one of said tubular members having a downwardly facing slot in its bottom wall and located adjacent said abutted ends, and elongate splice member having upper and lower longitudinal edges and shaped for lying contiguous to the inside of the front wall of each tubular member in an area adjacent the abutted ends to provide a splice therefor, at least one inwardly extending projection extending substantially the full length of the inside of said rod adjacent the lower longitudinal edge of the splice member for engaging the splice member to hold the same contiguous to the tubular members and to axially align the tubular members, said projection being located forwardly of said downwardly facing slot and said splice member extending longitudinally past at least a portion of the downwardly facing slot whereby the splice member is spaced therefrom, means on the inside of the rod for engaging the upper longitudinal edge of the splice member, a plurality of holders slidably mounted in the longitudinal slot for movement past at least a portion of the splice member and including at least one master slide, a pulley *housing* mounted on the inside of the rod in the area of said downwardly facing slot *and having front and rear walls and a connecting top wall, at least one cord guide pulley mounted between said front and rear walls of the pulley housing, means connecting the top wall of the pulley housing to said splice member to inhibit relative movement therebetween in a direction lengthwise of the splice member, first and second means for respectively connecting the rear wall of the pulley housing to said first and second tubular members for holding said tubular members in abutted relation and for holding the pulley housing and the connected splice member against movement lengthwise of the rod,* and a cord attached to the master slide, passing over the pulley and extending through said downwardly facing slot, whereby the splice member is positioned to provide free passage of the cord.

[8. A support for draperies and the like comprising first and second elongate rod sections having inner and outer surfaces and abutted end to end, at least one of said rod sections having wall means defining at least one passageway and a slot extending generally the full length of the passageway, a pair of longitudinal rails on the inner surface of said wall means of said one rod section and spaced from said slot, internal splice means having longitudinal edges on one end portion thereof engaged with the longitudinal rails of said one rod section adjacent the abutted ends of the rod sections for holding the rod sections generally aligned and in said abutted relationship, said one end portion of said splice means being contiguous to the inner surface of said one rod section in an area between said longitudinal rails, and means for securing the other end portion of the splice means to the other rod section.]

[9. A support for draperies and the like comprising first and second elongate rod sections having inner and outer surfaces and abutted end to end, at least one rod section having wall means defining at least one passageway and a slot extending generally the full length of the passageway, a pair of longitudinal rails on the inner surface of said one rod section spaced from said slot, splice means having longitudinal edges on one end portion thereof engaged with the longitudinal rails of said one rod section adjacent the abutted ends of the rod sections for holding the rod sections generally aligned and in said abutted relationship, said one end portion of said splice means being contiguous to the inner surface of said one rod section in an area between said longitudinal rails, means for securing the other end portion of the splice means to the other rod section, a separate pulley housing engaged with and positioned by said other end portion of the splice means and having a pair of generally parallel side members spaced from each other, and at least one pulley rotatably supported between the side members.]

[10. A support for draperies and the like comprising a rod including first and second tubular members having generally similar exterior faces and abutted end to end, each tubular member having a longitudinal slot therein, said longitudinal slots arranged in substantial alignment to provide a continuous slot extending generally the full length of the rod, a plurality of drapery carriers mounted on the rod for movement lengthwise thereof and each having a portion projecting through said slot, an elongate splice member shaped to extend alongside a portion of the inner wall of each tubular member remote from said slots and having longitudinally extending edges spaced from said slots, said tubular members each having integral longitudinally extending splice locating means on the interior thereof at the longitudinally extending edges of the splice member and spaced from the slots in said tubular members for retainingly engaging the splice member whereby to hold said tubular members generally aligned and in said abutted relationship.]

[11. A support for draperies and the like comprising a rod including first and second tubular members abutted end to end, said tubular members each having a face wall means at the front, top and bottom thereof and rear wall means at the rear thereof, said rear wall means of said first tubular member having a longitudinal slot extending generally the full length thereof, a plurality of drapery carriers mounted for movement lengthwise of said slot, said second tubular member having a cord opening in its face wall means adjacent the bottom thereof, drapery traverse means including a traverse cord means in said rod and extending downwardly through said cord opening, an elongate splice means having first and second end portions, said first end portion of the splice means extending into said first tubular member along a portion of the inner side of its face wall means and having longitudinally extending edges spaced from said slot, said first tubular member having integral longitudinally extending splice locating means on the interior thereof at the longitudinally extending edges of said first end portion and spaced from said slot for engaging and retaining said first end portion in a position spaced from said slot, said second end portion of the splice means extending into said second tubular member and having longitudinally extending edges spaced from said cord opening, and cord guide means in said rod for guiding the cord means from said rod through said cord opening.]

[12. A support for draperies and the like in accordance with claim 11 including means connecting said cord guide means to said splice means to inhibit relative movement therebetween in a direction lengthwise of said rod.]

[13. A support for draperies and the like comprising a rod including first and second tubular members abutted end to end, said tubular members each having a face wall means at the front, top and bottom thereof of generally similar external appearance and rear wall means at the rear thereof, said rear wall means of said first tubular member having a longitudinal slot extending generally the full length thereof, a plurality of drapery carriers mounted for movement lengthwise of said slot, said second tubular member having a cord opening in its face wall means adjacent the bottom thereof, drapery traverse means including traverse cord means in said rod and extending downwardly through said cord opening, an elongate splice means shaped to extend along a portion of the inner side of the face wall means of said first and second tubular members and having an upper lengthwise extending edge above said slot and a lower lengthwise extending edge forward of said cord opening, said tubular members having upper and lower longitudinally extending splice locating means on the interior thereof at the longitudinally extending edges of the splice means for retainingly engaging the splice means, and cord guide means in said rod for guiding the traverse cord means from said rod through said opening.]

14. [A support for draperies and the like in accordance with claim 13 wherein] *A support for draperies and the like comprising a rod including first and second tubular members abutted end to end, said tubular members each having a face wall means at the front, top and bottom thereof of generally similar external appearance and rear wall means at the rear thereof, said rear wall means of said first tubular member having a longitudinal slot extending generally the full length thereof, a plurality of drapery carriers mounted for movement lengthwise of said slot, said second tubular member having a cord opening in its face wall means adjacent the bottom thereof, drapery traverse means including traverse cord means in said rod and extending downwardly through said cord opening, an elongate splice means shaped to extend along a portion of the inner side of the face wall means of said first and second tubular members and having an upper lengthwise extending edge above said slot and a lower lengthwise extending edge forward of said cord opening, said tubular members having upper and lower longitudinally extending splice locating means on the interior thereof at the longitudinally extending edges of the splice means for retainingly engaging the splice means, and cord guide means in said rod for guiding the traverse cord means from said rod through said opening* said cord guide means [includes] *including* a pulley housing inside said rod and having front and rear walls and a cord guide pulley mounted therebetween, said front wall of the pulley housing having its lower edge extending alongside the lower splice locating means and said rear wall of the pulley housing extending alongside the rear wall means of the rod to be laterally located thereby.

[15. A support for draperies and the like comprising a rod including first and second tubular members having generally similar front faces and abutted end to end, said first tubular member having a longitudinal slot therein, a plurality of drapery carriers mounted on the first member for movement lengthwise of said slot, said first and second tubular members having first and second relatively parallel lengthwise extending groove means on the interior thereof spaced from each other and from their respective slots and opening in relatively different directions, and an elongate splice means inside said tubular members having first and second longitudinally extending edges respectively slidably exteding into said first and second groove means for retaining said first and second tubular members in aligned relation to each other, said splice means extending alongside the inner surface of said tubular members in an area between the groove means and remote from the slots.]

*16. A support for draperies according to claim 14 including means connecting the pulley housing to the splice means to inhibit relative movement therebetween in a direction lengthwise of the splice means, and first and second means for respectively securing the pulley housing to the first and second tubular members to hold the tubular members in abutted relation and to hold the pulley housing and the connected splice means against movement longitudinally of the rod.*

*17. A support for draperies according to claim 14 including means connecting the pulley housing to the splice means to inhibit relative movement therebetween in a direction lengthwise of the splice means, and first and second means for respectively securing the rear wall of the pulley housing to rear wall means of the first and second tubular members to hold the tubular members in abutted relation and to hold the pulley housing and the connected splice means against movement longitudinally of the rod.*

*18. A support for draperies according to claim 14 wherein the pulley housing has a U-shaped configuration and includes a top wall underlying said splice means, means connecting the top wall of the pulley housing to said splice means to inhibit relative movement therebetween in a direction lengthwise of the splice means, and first and second means respectively connecting the rear wall of the pulley housing to the rear wall means of said first and second tubular members to hold the tubular members in abutted relation and to hold the pulley housing and connected splice means against movement longitudinally of the rod.*

References Cited

The following references, cited by the Examiner, are of record in the patented file of this patent or the original patent.

UNITED STATES PATENTS

| | | | |
|---|---|---|---|
| 661,298 | 11/1900 | Wesnidge | 16—96 |
| 2,597,224 | 5/1952 | Charron et al. | 16—94 |
| 2,619,166 | 11/1952 | Graber | 160—344 |
| 3,095,033 | 6/1963 | Polkosnik | 160—345 |
| 3,419,065 | 12/1968 | Johnson | 160—345 |

RICHARD E. MOORE, Primary Examiner

J. H. McGLYNN, Assistant Examiner

U.S. Cl. X.R.

16—95